| United States Patent [19] | [11] Patent Number: 4,832,307 |
|---|---|
| Watanabe et al. | [45] Date of Patent: May 23, 1989 |

[54] INJECTION MOLD

[75] Inventors: Takeshi Watanabe; Yasukiyo Fuke, both of Numazu, all of Japan

[73] Assignee: Toshiba Kikai Kabushiki Kaisha, Tokyo, Japan

[21] Appl. No.: 244,391

[22] Filed: Sep. 15, 1988

[51] Int. Cl.⁴ ............................................. B29C 45/44
[52] U.S. Cl. ...................................... 249/63; 249/145; 249/152; 249/180; 249/184; 425/556; 425/577; 425/DIG. 58
[58] Field of Search ............... 425/438, 468, 556, 577, 425/DIG. 58, DIG. 5; 249/59, 63, 64, 145, 152, 180, 184

[56] References Cited

U.S. PATENT DOCUMENTS 3,905,740   9/1975   Lovejoy .............................. 425/577
4,362,291  12/1982   Fuke et al. ........................ 425/577
4,502,660   3/1985   Luther et al. ......................... 249/63

Primary Examiner—Jay H. Woo
Assistant Examiner—Timothy W. Heitbrink
Attorney, Agent, or Firm—Stevens, Davis, Miller & Mosher

[57] ABSTRACT

An injection mold having a pair of stationary and movable molding plates, a plurality of sidewalls moved by one or more hydraulic cylinder assemblies disposed between the stationary and movable molding plates through inclined guide pins or guide blocks, a core member provided with a slanting surface and secured to the movable molding plate inside the sidewalls, and slide core members being movable in engagement with the core member. The respective sidewalls, and the sidewalls and the slide core members are connected by a connecting mechanism including link plates and connection plates so that the sidewalls and the slide core members are substantially simultaneously moved by at least one of the hydraulic cylinder assembly.

5 Claims, 5 Drawing Sheets

INJECTION MOLD

BACKGROUND OF THE INVENTION

This invention relates to an injection mold for forming from a synthetic resin a polygonal vessel closed at its bottom and having undercuts formed on its inner and outer surfaces.

A conventional mold for manufacture of a molded article of this type is constituted by a stationary molding plate, movable molding plate, a plurality of sidewalls provided between these plates, a core having slanting surfaces, disposed inside the sidewalls and integral with or attached to the movable molding plate, and slide cores sliding on the slanting surfaces of the former core in engagement therewith. In order to mold, by using a mold of this type, an article having undercuts on its inner and outer surfaces, the core is removed inward while the sidewalls are moved outward so as to be moved away from the undercuts. For this reason, mechanisms for releasing the mold from such undercuts have been adopted for example as disclosed in U.S. Pat. No. 3,905,740. There are examples of a mechanism for releasing sidewalls such as one in which an inclined pin is secured to the stationary molding plate and sidewalls are released in such a manner that, when the movable molding plate and the sidewalls are simultaneously moved at the time of mold opening, the sidewalls are pushed outward by the inclined pins, and one in which a cylinder which serves as a power source for moving a sidewall outward and an inclined pin are attached to the stationary molding plate so as to enable the sidewalls release under the guidance of the inclined pina. In an example of the latter type adapted for the mold designed to simultaneously release a plurality of sidewalls from undercuts, the number of cylinders employed is smaller than the number of sidewalls, and the sidewalls are interconnected by connection pins or linking plates. In another example, a spacer is mounted between the movable molding plate and a mount plate attached to a movable die plate of the body of the injection molding apparatus so as to form a space in which an ejection plate connected to an ejection rod of the body of the injection molding apparatus and made to advance or retract, and the ejection plate and sidewalls having slanting surfaces are connected by links, thereby pushing forward the ejection plate and outwardly releasing the sidewalls along slanting surfaces of reinforcement frames outside the sidewalls.

A mechanism for releasing the slide cores from a molded product is constructed in such a manner that an ejection plate is disposed between a mount plate and a movable molding plate in a manner similar to that in the case of the aforementioned sidewall releasing mechanism, this ejection plate being connected by links to slide cores capable of being pushed forward so that the slide cores are made to slide along slanting surfaces of the core, thereby releasing the mold.

As described above, mechanisms for moving the sidewalls and the slide cores away from undercuts have been adopted. In general, the operation of such mechanisms resides in that the slide cores are moved after the sidewalls have been moved. However, in an example such as disclosed in U.S. Pat. No. 3,905,740, an ejection plate is provided between a movable molding plate and a mount plate attached to a movable die plate of an injection molding machine, and this ejection plate is connected to slide cores and sidewalls by links so that the sidewalls and the slide cores are moved simultaneously.

There are various problems of the conventional injection molds due to the above-described structures, as described below. If the sidewalls and the slide cores are separately moved, that is, the slide cores are moved after the sidewalls have been moved, the molding cycle is lengthened and the productivity is lowered. Since, if the sidewalls are moved by the inclined pins alone, excessive forces are applied to the inclined pins, it is necessary to open the mold at a low speed. This is also undesirable because the molding cycle is lengthened. The mechanism in which the ejection plate is provided and is connected to the sidewalls or the slide cores by links necessitates a space for advancing or retracting movement of the ejection plate, increasing the entire size and weight of the mold as well as making the link mechanism complicate and increasing the number of parts. The failure occurring rate is thereby increased, which is undesirable in terms of maintenance.

SUMMARY OF THE INVENTION

An object of this invention is to substantially eliminate defects or drawbacks described above and to provide an injection mold which is reduced in size and weight compared with the conventional molds so as to be suitable for cycle-up design, which is designed to reduce the number of component parts, enabling a reduction in the failure occurring rate and facilitating the maintenance, and which can be manufactured at a low cost.

This and other objects can be achieved according to this invention by providing an injection mold comprising a pair of stationary and movable molding plates, a plurality of sidewalls moved between the stationary and movable molding plates by one or more hydraulic cylinder assemblies through a guide mechanism, a core member provided with a slanting surface and secured to the movable molding plate at an inside of the sidewalls, slide core members being movable in engagement with the first mentioned core member, and a connecting or linking mechanism for slidably connecting the respective sidewalls and connecting the sidewalls and the slide core members so that the sidewalls and the slide core members are substantially simultaneously moved by at least one of the hydraulic cylinder assemblies.

According to the construction of the injection mold of the character described above, the connection mechanism is specifically adapted to connect the plurality of sidewalls respectively and also connect the sidewalls and the slide core members thereby to transmit the power through the connection mechanism. The plurality of the sidewalls and the slide core members are moved simultaneously by the actuation of at least one hydraulic cylinder assembly, thus facilitating the manufacture of a molded product having internal and external undercuts, reducing the period of the injection molding cycle, and reducing the overall size of the injection mold.

The preferred embodiment of this invention will be described further in detail hereinafter with reference to the accompanying drawings.

DESCRIPTION OF THE PREFERRED EMBODIMENTS

Figure 1:
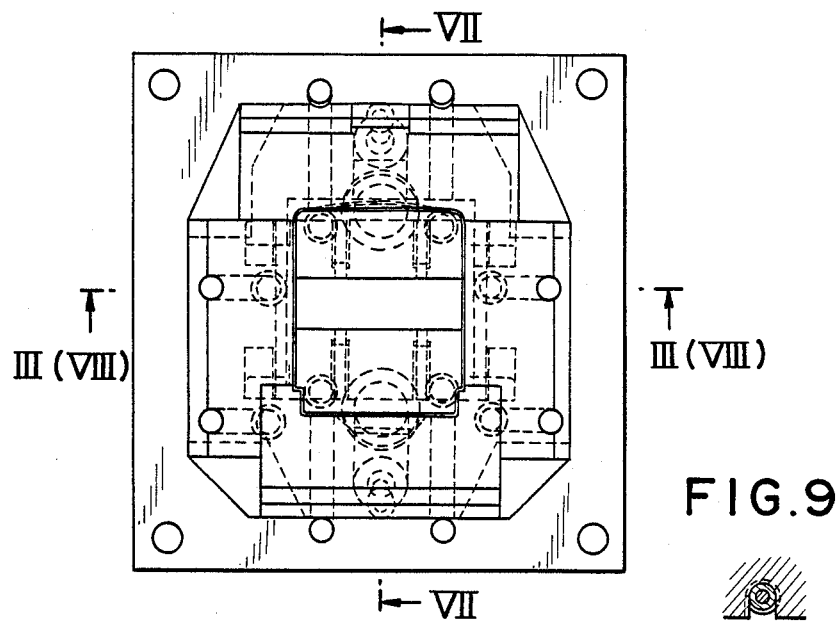
FIG. 1 is a plan view in the direction of a movable plate illustrating a state during molding, a stationary molding plate being removed.

The embodiment of the mold of the present invention is used to manufacture a generally rectangular molded product having undercuts formed inside and outside thereof, and referring to FIG. 1, an illustrated mold is viewed in a closed state in the direction of a movable molding plate while the stationary molding plate is removed.

Figure 9:
FIG. 9 is a cross-sectional view taken along the line IX—IX of FIG. 2.
Figure 2:
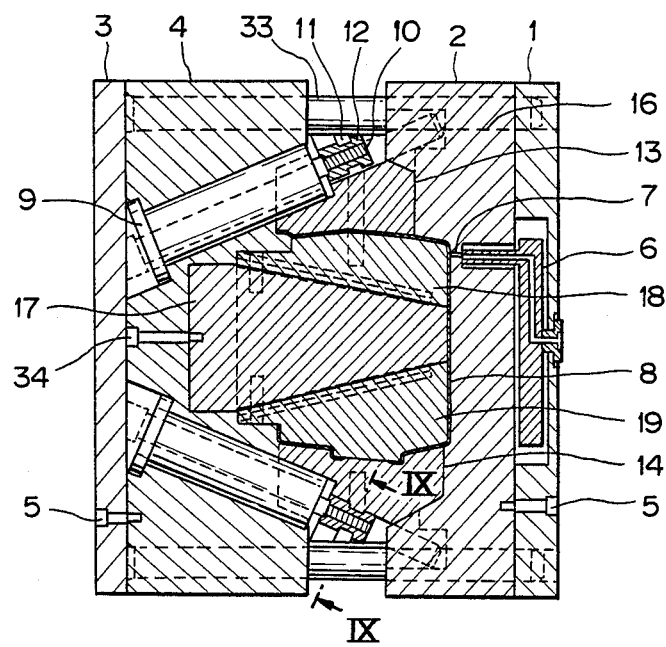
FIG. 2 is a cross-sectional view of a state during the molding.

FIG. 2 shows a state in which the mold is closed and a resin is injected, a stationary molding plate 2 and a movable molding plate 4 are fixed to a mount plate 1 and a mount plate 3 by means of bolts 5, and the mount plate 1 is fixed to a stationary die plate of an injection molding machine (not shown) while the mount plate 3 is fixed to a movable die plate. Therefore, the mount plate 3 and the movable molding plate 4 are moved to the left or right (as viewed in FIG. 2) as the movable die plate of the injection molding machine moves. A runner block 6 having a path through which a molten resin is introduced into a mold cavity is provided inside the mount plate 1. The runner block 6 has one portion extending inside the stationary molding plate 2 and the front end of the extension is connected to a gate 7 formed inside the stationary molding plate 2. The inside of the stationary molding plate 2 is formed as a mold section for forming outside surfaces of the bottom of a molded product 8 and portions of sidewalls thereof near the bottom. Two hydraulic or pneumatic cylinder assemblies 9 are attached to the movable molding plate 4 while being inclined in such a manner that they pass through the moving molding plate 4 from the side of the mount plate 3 and open at the side of the stationary plate 2. A nut 12 in the form of a cylinder having a ring-shaped groove 11 formed in its outer surface generally at the center thereof is screwed around the top of a rod 10 of each hydraulic cylinder assembly 9, and a U-shaped cutout 15 (see FIG. 9) formed in one of sidewalls 13 and 14 for forming the surfaces of sidewalls of the molded article 8 (upper and lower surfaces shown in FIG. 2) is fitted into the groove 11 so that when the rods 10 of the hydraulic cylinder assemblies 9 advance or retract, the sidewalls 13 and 14 also move simultaneously along later-described inclined pins. Also, two sidewalls 24 and 25 for forming the outside surfaces of the other two walls of the molded product 8 while connecting to the sidewalls 13 and 14 are separately provided. These four sidewalls 13, 14, 24, and 25 form almost entire part of the outside surfaces of the molded product 8.

Four guide pins for positioning the stationary molding plate 2 and the movable molding plate 4 pass through the movable molding plate 4 from the side of the mount plate 3 to the side of the stationary molding plate 2. The extreme ends of these guide pins 33 are fitted into holes 16 in the stationary molding plate 2 when the mold is closed. A core 17 having a trapezoidal cross section is fixed by bolts 34 to the movable molding plate 4 generally at the center thereof. Slide cores 18 and 19 which are disposed outside the core 17 are connected thereto by guide pieces 21 having T-shaped cross sections and fixed to the core 17 by bolts 20. The slide cores 18 and 19 are slidable along the slanting surfaces of the core 17 corresponding to oblique sides of the trapezoidal cross section. When the mold is opened, the slide cores 18 and 19 slide on the slanting surfaces of the core 17 and move inward so that they become closer to each other. The core 17 and the slide cores 18 and 19 form the internal surfaces of the molded product 8 in cooperation with each other. When the mold is opened, the sidewalls 13, 14, 24, and 25 outwardly move away from each other (in the vertical direction as viewed in FIG. 2 or 3) while the slide cores 18 and 19 move inward so that they become closer to each other (in the vertical direction as viewed in FIG. 2).

Figure 3:
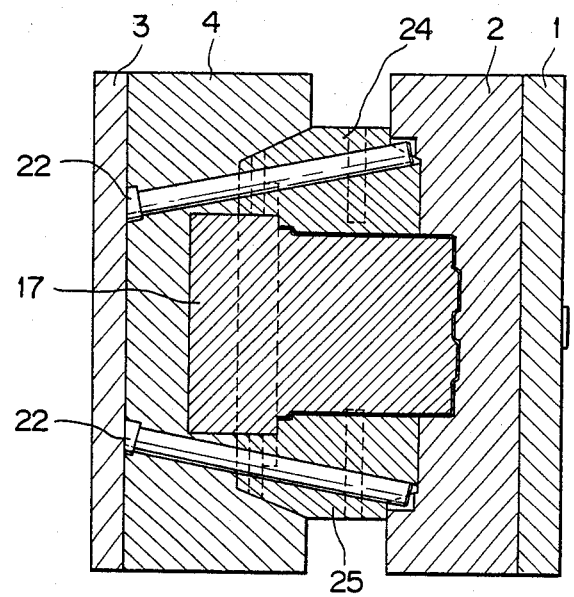
FIG. 3 is a cross-sectional view taken along the line III—III of FIG. 1.
Figure 4:
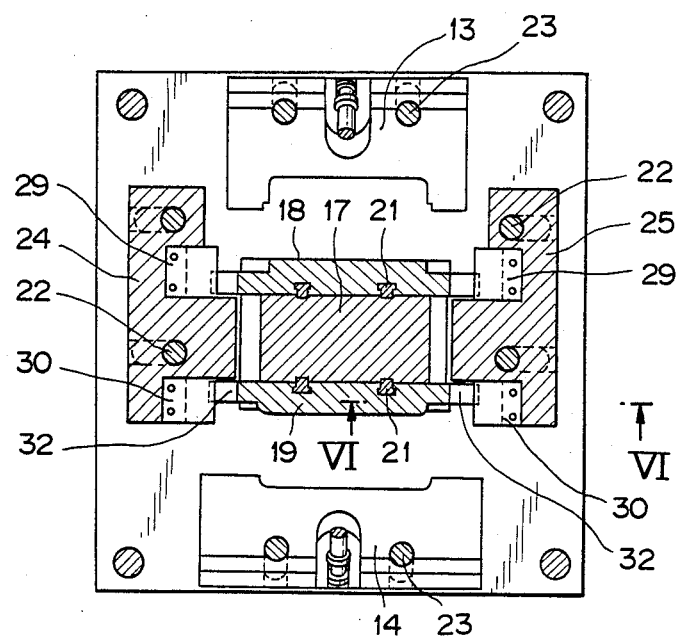
FIG. 4 is a cross-sectional view taken along the line IV—IV of FIG. 7.

As shown in FIGS. 3 and 4, eight inclined pins 22 and 23 which extend toward the stationary molding plate 2 at the same angle as the hydraulic cylinder assemblies 9 and which pass through the movable molding plate 4 and through the sidewalls 13, 14, 24, and 25 are provided on the movable molding plate 4. The inclined pins 22 and 23 are fixed by being pinched by the mount plate 3 and the movable molding plate 4. The sidewalls 13, 14, 24, and 25 are obliquely moved while being guided by the guide pins 22 and 23. Two of the inclined pins 22 and 23 are inserted into one sidewall so as to support the sidewall during movement thereof.

Figure 5:
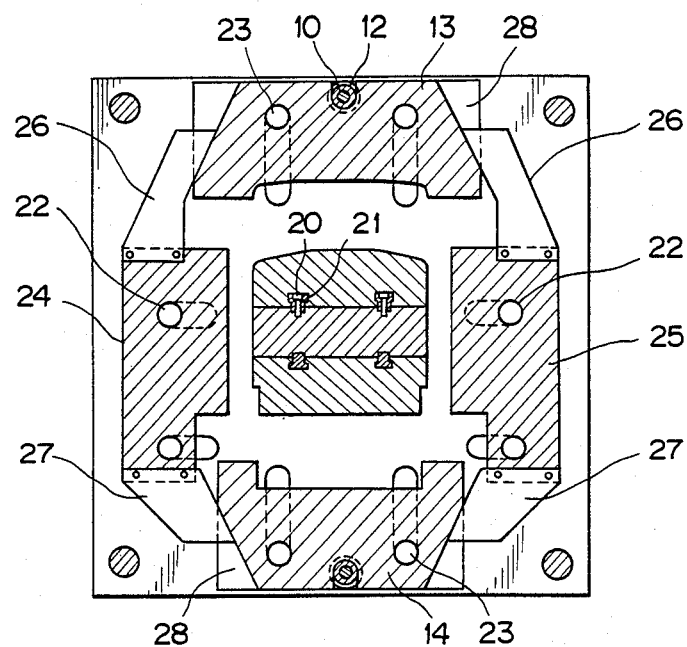
FIG. 5 is a cross-sectional view taken along the line V—V of FIG. 7.

As shown in FIG. 5, ends of linking plates 26 and 27 are attached to upper and lower portions of the sidewalls 24 and 25 generally at the center in the direction of movement of the movable molding plate 4 so as to connect the sidewalls 24 and 25 to the sidewalls 13 and 14. The other ends of the linking plates 26 and 27 are inserted into grooves 28 formed by cutting in the sidewalls 13 and 14, and the linking plate 26 and 27 function to transmit power while sliding in the grooves 28 of the sidewalls 13 and 14 when the sidewalls 13 and 14 are moved by the actuation of the hydraulic cylinder assemblies 9 while being guided by the inclined pins 23.

Figure 6:
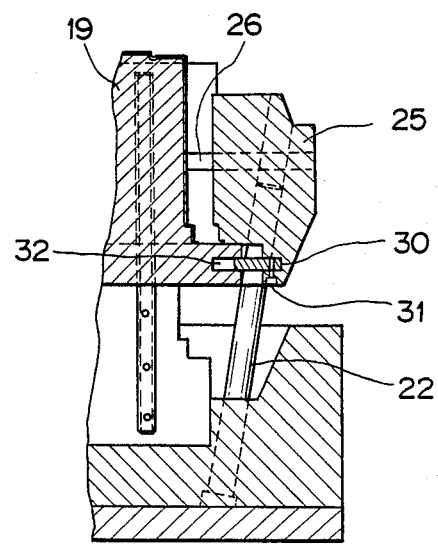
FIG. 6 is a cross-sectional view taken along the line VI—VI of FIG. 4.

As shown in FIGS. 4 and 6, connection plates 29 and 30 for moving the slide cores 18 and 19 together with the sidewalls 24 and 25 in the direction of movement of the movable molding plate 4 for opening or closing the mold by linking the slide cores 18 and 19 to the sidewalls 24 and 25 respectively at two portions thereof are connected at one ends to the sidewalls 24 and 25 by bolts 31. The other ends of the connection plates 29 and 30 are inserted into grooves 32 formed by cutting in the slide cores 18 and 19. As the sidewalls 24 and 25 move, the connection plates 29 and 30 move together with the slide cores 18 and 19 while sliding in the grooves 32. In this embodiment, the sidewalls 13 and 14 that are moved while being directly connected to the hydraulic cylinder assemblies 9 are linked to the sidewalls 24 and 25 by the linking plates 26 and 27, and the sidewalls 24 and 25 and the slide cores 18 and 19 are linked by the connection plates 29 and 30. However, another different arrangement is possible in which the sidewalls 13 and 14 and the slide cores 18 and 19 are linked by the linking plate while the slide cores 18 and 19 and the sidewalls 24 and 25 are linked by the connection plates 29, 30.

In the described embodiment, the core 17 is fixed to the movable molding plate 4 and the cylinder assemblies 9 as well as the inclined pins 22 and 23 are also fixed to the movable molding plate 4. However, in a mold structure designed to prevent formation of gate marks on the outside surface of the molded article 8, the core may be fixed to the stationary molding plate while the cylinder assemblies and the inclined pins are also fixed to the stationary molding plate. In this structure, the runner block passes through the core fixed to the stationary molding plate.

Figure 7:
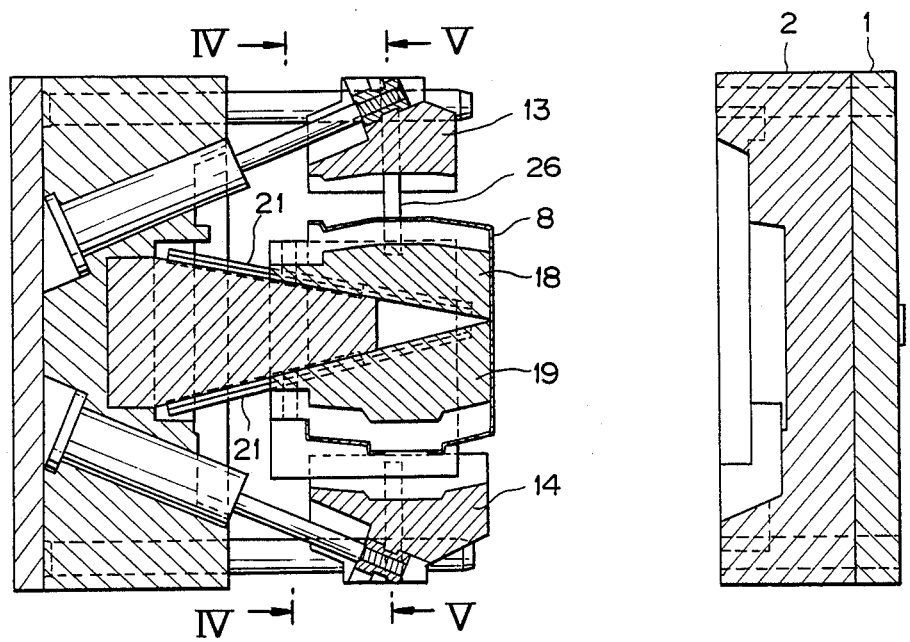
FIG. 7 is a cross-sectional view taken along the line VII—VII of FIG. 1 when the mold is opened.
Figure 8:
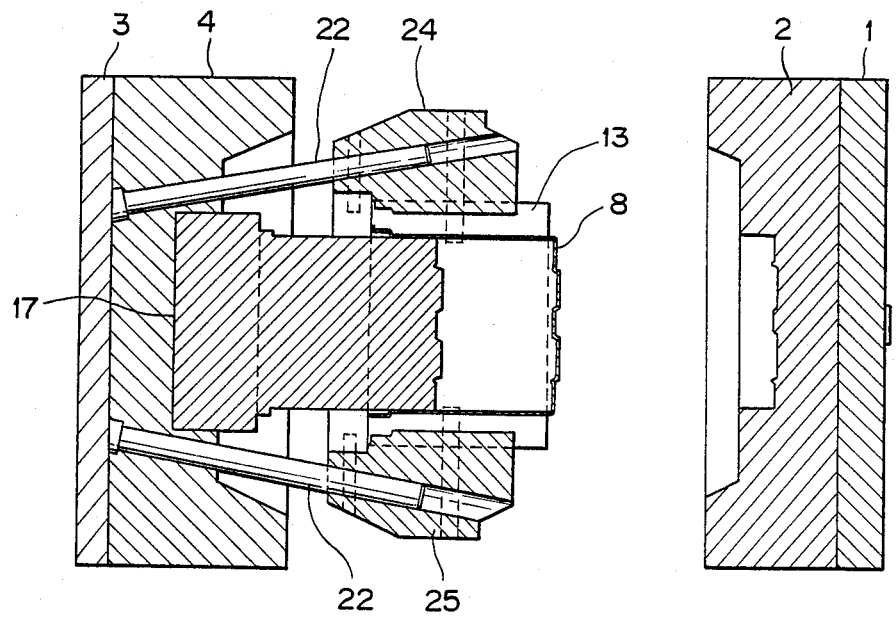
FIG. 8 is a cross-sectional view similar to FIG. 3 and taken along the line VIII—VIII of FIG. 1 when the mold is opened.

The operation of the injection mold of the character described hereinabove will be described hereunder. The mold is clamped by a clamping device (not shown) of the injection molding machine, and, in a state shown in FIG. 2, a molten resin is injected under pressure through the runner block 6. The injection resin is introduced under pressure into the cavity in which the molded product 8 is formed. The resin is thereafter cooled and set except for a part at the runner block 6. The operation of opening the mold is then started. Under the condition in which the stationary molding plate 2 is maintained in a place as it is, as shown in FIGS. 7 and 8, the core 17 and the hydraulic cylinder assemblies 9 directly connected to the movable molding plate 4, the sidewalls 13, 14, 24, and 25 linked by the linking plates 26 and 27 and the slide cores 18 and 19 linked by the connection plates 29 and 39 are all moved to the left together with the molded product 8. FIG. 7 shows a state in which the sidewalls 13, 14, 24, and 25 and the slide cores 18 and 19 are moved to the right as the rods 10 of the cylinder assemblies 9 are moved forward (to the right) by the actuations of the hydraulic cylinders 9 after the movable molding plate 4 has retracted (moved to the left) to the retracting limit so that the sidewalls 13, 14, 24, and 25 are moved outward (in the vertical direction) away from the molded product 8 and, at the same time, the slide cores 18 and 19 are moved inward and disengaged from the undercuts of the molded product 8. In this state, the molded product 8 is removed manually or by a removing device.

The sidewalls 13, 14, 24, and 25 move while being guided by the inclined pins 22 and 23, and the slide cores 18 and 19 move while being guided by the guide plates 21. The sidewalls 13 and 14 are directly moved by the hydraulic cylinder assemblies 9 while the sidewalls 24 and 25 are moved by the medium of the linking plates 26 and 27. The slide cores 18 and 19 are moved by the medium of the connection plates 29 and 30. The state shown in FIG. 7 is described above as a state in which the hydraulic cylinder assemblies 9 are operated after the movable molding plate 4 has retracted to the retracting limit. Instead, the hydraulic cylinders 9 can be operated during the retracting motion of the movable molding plate 4. It is more preferable to adopt this method in terms of reduction in the operation cycle of manufacture work. After the molded product 8 has been removed, the mold clamping operation is conducted in the reverse order relative to the mold opening.

It should be understood that the present invention is described hereinbefore with reference to the preferred embodiments, but the present invention is not limited to them and other various changes and modifications may be made without departing from the scopes or spirits recited in the appended claims.

What is claimed is:

1. An injection mold comprising:
   a pair of stationary and movable molding plates;
   a plurality of sidewalls moved by one or more hydraulic cylinder means between said stationary and movable molding plates through guide means;
   a core member provided with a slanting surface and secured to said movable molding plate at an inside of said sidewalls;
   slide core members being movable in engagement with the first mentioned core member; and
   means for slidably connecting said sidewalls mutually and connecting said sidewalls and said slide core members so that said sidewalls and said slide core members are substantially simultaneously moved by at least one of said hydraulic cylinder means.

2. The injection mold according to claim 1 wherein said guide means are inclined guide pins secured to said movable molding plate and extending therefrom.

3. The injection mold according to claim 1 wherein said guide means are inclined guide blocks attached to said movable molding plate.

4. The injection mold according to claim 1 wherein said connecting means includes linking plates connecting the respective sidewalls and connection plates connecting the sidewalls and the slide cores.

5. The injection mold according to claim 1 wherein said hydraulic cylinder means and said guide means are secured to said movable molding plate.

* * * * *